United States Patent [19]
Neuringer
[11] 4,296,408
[45] Oct. 20, 1981

[54] LOCATION TRANSMITTING SYSTEM

[75] Inventor: Jules K. Neuringer, Belle Harbor, N.Y.
[73] Assignee: Portronix Communications Inc., Brooklyn, N.Y.

[21] Appl. No.: 139,759
[22] Filed: Apr. 14, 1980
[51] Int. Cl.³ .......................... G08B 1/08; H04Q 7/00
[52] U.S. Cl. .................................... 340/539; 340/305; 340/306; 340/307; 340/312; 455/95; 455/99; 455/100; 455/127; 455/128; 455/351; 361/172
[58] Field of Search ............... 340/539, 531, 534, 305, 340/306, 307, 309.1, 312, 345, 694, 695, 696, 23, 24, 32, 33; 455/38, 39, 49, 53, 54, 58, 67, 89, 95, 99, 100, 101, 115, 127, 128, 343, 348, 349, 351; 343/112 R; 361/172

[56] References Cited
U.S. PATENT DOCUMENTS
3,573,620 4/1971 Ashley ................................ 340/539
3,577,079 5/1971 Horstmann .......................... 340/539
3,579,221 5/1971 Ashley ................................ 340/539
3,990,067 11/1976 Van Dusen et al. ................ 340/306

*Primary Examiner*—John W. Caldwell, Sr.
*Assistant Examiner*—Donnie Leo Crosland
*Attorney, Agent, or Firm*—Charles A. Blank

[57] ABSTRACT

A location transmitting system for use by one or more guards in a security system. Encoders are located at predetermined reporting locations which have no power supplies. Each guard carries a walkie-talkie radio transmitter which he places in a receptacle at the reporting location, energizing the encoder through external terminals in the receptacle which mate with external terminals of the walkie-talkie and its power supply.

4 Claims, 4 Drawing Figures

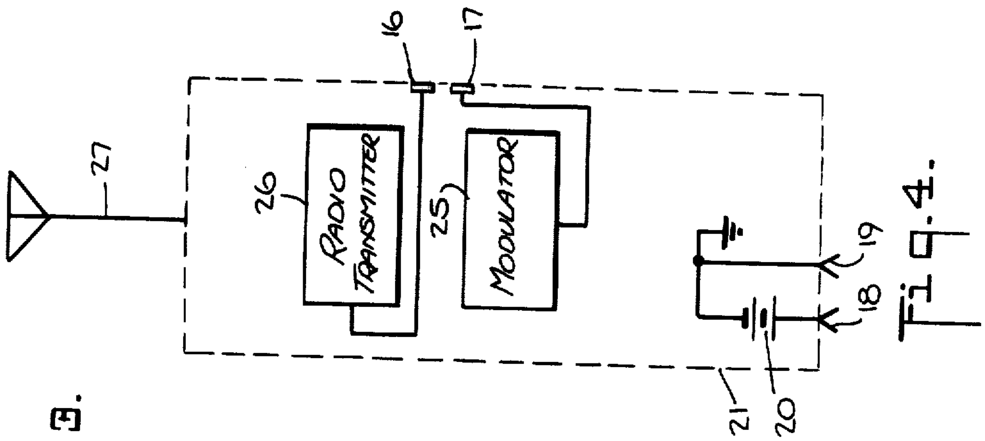
Fig. 4.
Fig. 3.
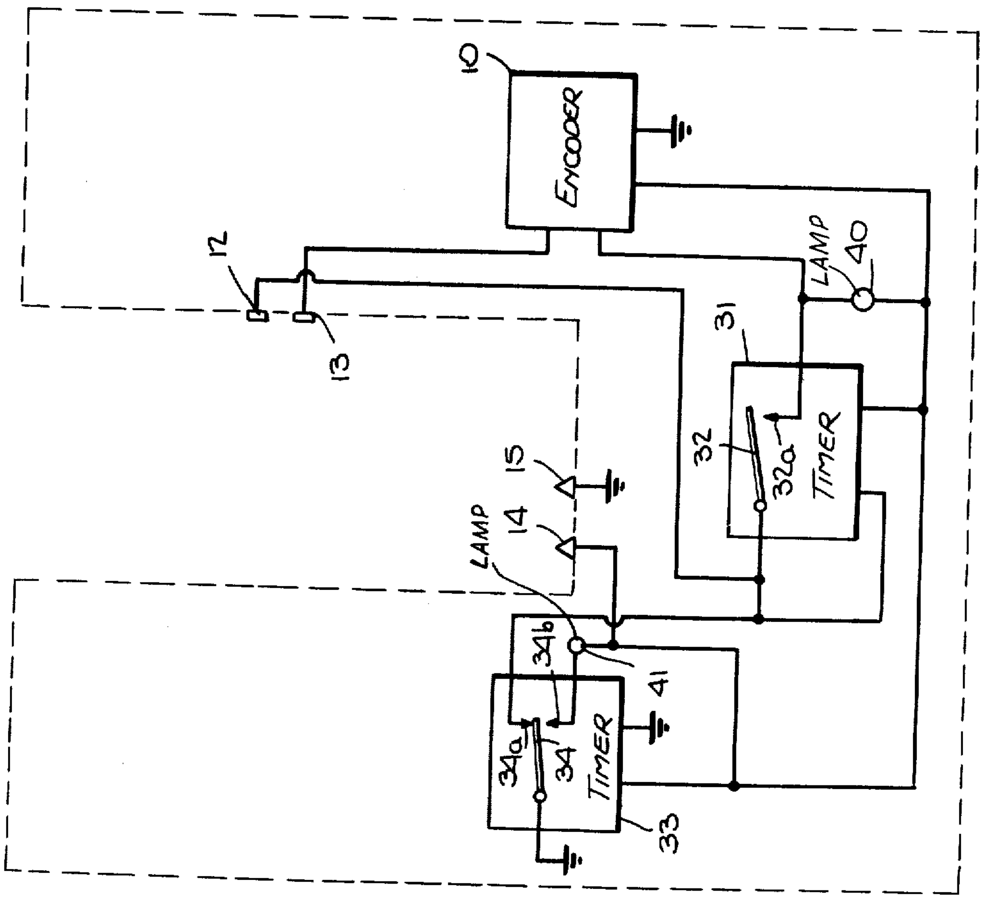

LOCATION TRANSMITTING SYSTEM

This invention relates to a location transmitting system for use, for example, by one or more guards in a security system.

In security systems for remote locations such as various building areas, security guards are ordinarily assigned to patrol predetermined paths through the facilities. In order to enable their supervisors to monitor their routes, the guards are provided with a time-clock which is activated by a key affixed at various critical locations about the building. At the end of the guards's tour, the supervisor can ascertain the time that the guard passed each of the locations by reviewing a tape in the time-clock.

A system is also known in which each security guard carries a mobile unit including a mobile encoder, a mobile transmitter and a microphone. The guard then transmits a coded signal which he selects by actuating one of several code selectors of the encoder to represent his location. This system has the disadvantage that each security guard must carry an encoder capable of developing signals of several codes.

U.S. Pat. Nos. 3,577,079 and 3,579,221 relate to security systems in which the guard connects or inductively couples a mobile radio transmitter, which transmits a continuous carrier wave signal, to a tour location or wall box which contains a frequency determining component. Thus, from time to time the continuous carrier wave signal is modulated by a modulating frequency signal representing a particular tour location. If there are several guards transmitting continuous carrier wave signals to a single remote radio receiver, the system cannot operate satisfactorily because the remote receiver can only receive one signal from one guard. Also, a specially designed radio transmitter mobile unit without a microphone and with special circuitry added is necessary, which prevents the mobile unit from being used for normal voice communications. Further, the loop frequency generator at the tour location of patent 3,579,221 requires a power supply for its operation, restricting its use to areas which are near a power source.

In U.S. Pat. No. 3,573,620 a specially designed radio transmitter mobile unit without a microphone is used. Thus, an existing walkie-talkie radio unit carried by a security guard could not be used for normal voice communications as well as location reporting. The mobile unit also transmits a continuous carrier wave signal so that the remote receiving station can only receive one signal from one guard. If there are several guards transmitting continuous carrier wave signals to a single remote radio receiver, the system cannot operate satisfactorily. Also, the loop frequency generator at the tour location requires a power supply for its operation, restricting its use to areas which are near a power source.

U.S. Pat. No. 3,990,067 relates to a security system in which the guard carries a special electronic tour key for use with active and passive tour stations. Each active tour station is wired to a tour information signal receiver and alarm transmitter which is connected to a telephone line for transmission to a remote security monitoring station.

Such prior systems described in the above-mentioned patents are more complex than is desirable for some applications.

It is an object of the present invention, therefore, to provide a new and improved location transmitting system which avoids one or more of the disadvantages of such prior systems.

It is another object of the invention to provide a new and improved location transmitting system for which a guard carries only a walkie-talkie radio unit capable of both location transmission and normal voice transmission.

It is another object of the invention to provide a new and improved location transmission system capable of use by several guards and a single remote monitoring station.

It is another object of the invention to provide a new and improved location transmission system in which each tour location unit is a passive unit.

In accordance with the invention, a location transmitting system comprises a mobile unit including power supply means having external terminals. The system also includes a plurality of encoder means at different predetermined locations for generating coded signals individually representative of the locations. Each of the encoder means has external terminals contacting the power supply terminals of the mobile unit. The system also includes a radio transmitter in the mobile unit for transmitting a radio signal at each of the encoder means locations. Each of the encoder means is energized and each of the encoder means is effective to modulate the transmitter which transmits an encoded radio signal representative of the location when the mobile unit is so positioned that the power supply terminals thereof contact the external terminals of the encoder means.

For a better understanding of the present invention, together with other and further objects thereof, reference is made to the following description, taken in connection with the accompanying drawings, and its scope will be pointed out in the appended claims.

Referring now to the drawings:

FIG. 3 is a schematic circuit diagram of an encoder and associated circuits of the encoder means at a reporting location; and FIG. 4 is a schematic circuit diagram of a mobile unit carried by a guard.

Figure 1:
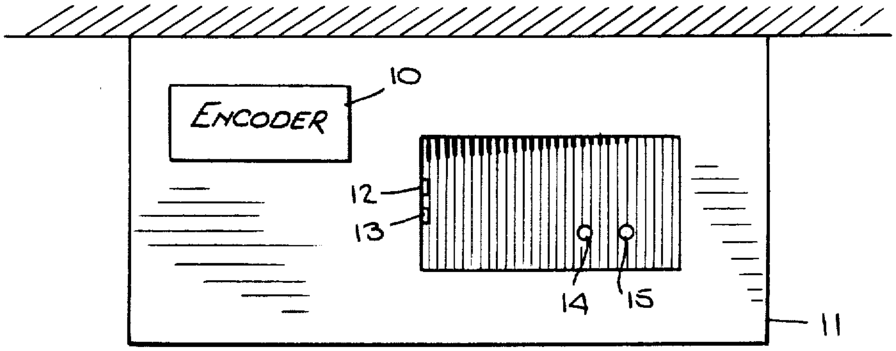
FIG. 1 is a plan view of a receptacle enclosing encoder means and having terminals of the encoder means therein at a reporting location.
Figure 2:
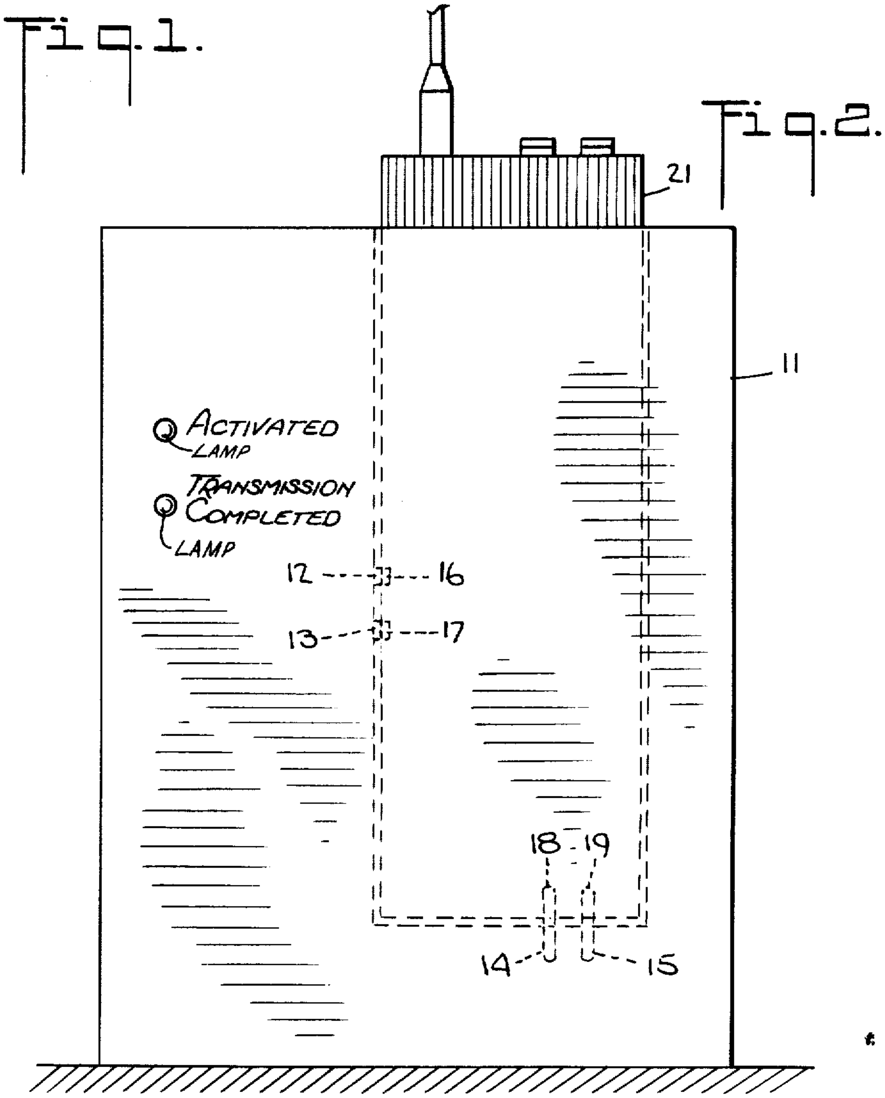
FIG. 2 is a front elevational view of the FIG. 1 encoder means with a mobile radio unit therein with terminals contacting the terminals of the encoder means.

Referring now more particularly to FIGS. 1 and 2 of the drawings, the location transmitting system includes at each predetermined reporting location an encoder 10, represented diagramatically in FIG. 1, and a receptacle 11 having external terminals 12, 13, 14, 15 of the encoder means therein for placement of a mobile unit therein such that its external terminals 16, 17, 18, 19 contact the external terminals 12, 13, 14, 15 of the encoder means. The mobile unit includes power supply means, for example, a battery 20, represented in FIG. 4, having external terminals 18, 19.

The location transmitting system includes a plurality of encoder means at different predetermined locations for generating coded signals individually representative of the locations, each of the encoder means having external terminals 14, 15, contacting the power supply terminals 18, 19, of the mobile unit.

By the term "predetermined location" for each encoder means, it is meant that the encoder means is positioned at a known location, for example, within a particular room of a building but the encoder means need not be attached to a fixed structure in the room and may be moved from time to time within the room if the security system is such that the signal of the encoder means is understood merely to indicate that the encoder means is in the room and is actuated by the mobile unit when in the room.

Referring now to FIG. 4, there is provided a radio transmitter in the mobile unit 21 for transmitting a radio signal at each of the encoder means locations. The mobile unit of FIG. 4 preferably is a walkie-talkie carried by a security guard and having a modulator 25, which may, for example, be a frequency or amplitude modulator, having an input circuit connected to external terminal 17. The modulator is connected to an input circuit of a radio transmitter 26 having an antenna 27. A terminal 16 analagous to a push-to-talk terminal but which is activated electrically rather then mechanically is connected to the transmitter 26 for energizing the transmitter for transmission of a carrier signal under the control of the location reporting station. Terminal 17 is connected to the modulator for applying an encoded modulation signal representative of the encoder means location.

The system may include, for example, at each encoder means location an encoder 10 of a conventional type generating a high speed tone signal encoded to represent the individual location. The encoded signal is, therefore, different at each encoder means location. The encoder 10 has its output circuit connected to terminal 13 for mating with the terminal 17 of the mobile unit 21 when the mobile unit is in thė receptacle 11 of FIGS. 1 and 2.

The encoder 10 also has a trigger output circuit connected to a relay contact **32*a* of a timing unit 31. The other contact 32 of the timing unit is connected to the external terminal 12 for mating with the push-to-talk terminal 16 of the mobile unit 21 when the mobile unit is in the receptacle 11**.

The location reporting station may also include a timing unit 33 having a relay contact connected to the input circuit of timing unit 31 and to the push-to-talk terminal 12. Each location reporting station is, however, passive and does not include a power supply. The external terminals 14, 15 may be connected to the timing units 31, 33 and the encoder 10 as represented in FIG. 3. Each of the encoder means at the location reporting stations is energized and each of the encoder means is effective to modulate the transmitter of the mobile unit which transmits an encoded radio signal representative of the location when the mobile unit is so positioned that the power supply terminals contact the external terminals of the encoder means.

The encoder means preferably includes means for actuating the transmitter when the mobile unit is so positioned that the power supply terminals contact the external terminals of the encoder means. The actuating means comprises the timing units 31, 33.

The mobile unit 21 may also include a conventional microphone (not shown) for walkie-talkie voice communication.

Considering now the operation of the location transmitting system, when a security guard carrying the mobile unit 21 reaches an encoder location, he places the mobile unit 21 in the receptacle 11 as represented in FIG. 2. The external terminals 16, 17, 18, 19 of the mobile unit mate with the terminals 12, 13, 14, 15 in the receptacle. Thus, the battery 20 of the mobile unit 21 energizes the timers 31, 33 and the encoder 10 at the reporting location. The timer 33 keys the radio transmitter 26 through the push-to-talk terminals 12, 16, which places the associated system receiver located at a remote location in a state of readiness to receive a coded signal. The timer 33 also actuates the timer 31, which begins its timing period. When the end of the timing period of timer 31 occurs, the relay contacts **32, 32*a* close, triggering the encoder 10 and lighting an indicator lamp 40 to indicate coding sequence in progress. The encoder output signal, which preferably is a pulse-coded signal of audio frequency signals of two or more frequencies, represents the encoder location. The encoder output signal is applied through the terminals 13, 17 to the modulator 25, which frequency or amplitude modulates the radio transmitter 26** to transmit the coded signal. The entire code may be transmitted in one-quarter second or less.

After the code has been transmitted, the timer 33 ends its timing period and relay contact 34 moves from contact **34*a* to contact 34*b*, thereby opening the keying circuit to the push-to-talk terminals 12, 16 and the timing unit 31. The contacts 32, 32*a* of timer 31 open and the sequence-in-progress lamp indicator 40 is extinguished. The sequence-complete indicator lamp 41 is then energized. The mobile unit 21 may then be removed from the receptacle 11 of FIG. 2**.

It will be apparent that the encoder 10 need not be electrically coupled to the modulator 25. For example, the encoder 21 may be coupled to a loudspeaker at the encoder location and the microphone of the mobile unit may be positioned to respond to the acoustical signal from the loudspeaker, thereby to enable the encoder to modulate the transmitter.

Also, the push-to-talk actuation of the mobile unit need not be electrically controlled. For example, a push-to-talk button on the mobile unit may be actuated when the mobile unit is placed in the receptacle.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

I claim:

1. A location transmitting system comprising:

a mobile unit including power supply means having external terminals;

a plurality of encoder means at different predetermined locations for generating coded signals individually representative of said locations, each of said encoder means having external terminals for contacting said power supply terminals of said mobile unit;

a radio transmitter in said mobile unit for transmitting a radio signal from each of said encoder means locations;

each of said encoder means being energized and each of said encoder means being effective to modulate said transmitter to transmit an encoded radio signal representative of the location when said mobile unit is so positioned that said power supply terminals thereof contact said external terminals of said encoder means.

2. A system in accordance with claim 1 which includes means for actuating said transmitter for a timed duration sufficient to allow transmission of an encoded signal when said mobile unit is so positioned that said power supply terminals contact said external terminals of said encoder means.

3. A system in accordance with claim 1 which includes a receptacle at each encoder means location having said external terminals of said encoder means therein for placement of said mobile unit therein to actuate the corresponding encoder.

4. A system in accordance with claim 1 in which each of said encoder means also includes transmitter actuating signal and encoder output signal external terminals and in which said mobile unit has external terminals mating with said transmitter actuating signal and encoder output signal terminals.

* * * * *